Sept. 24, 1957  R. E. JOHNSON ET AL  2,807,467
ILLUSION DEVICE
Filed Dec. 7, 1953
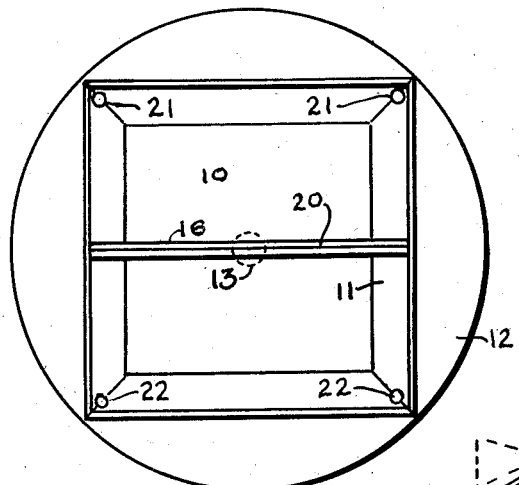
Fig. 1
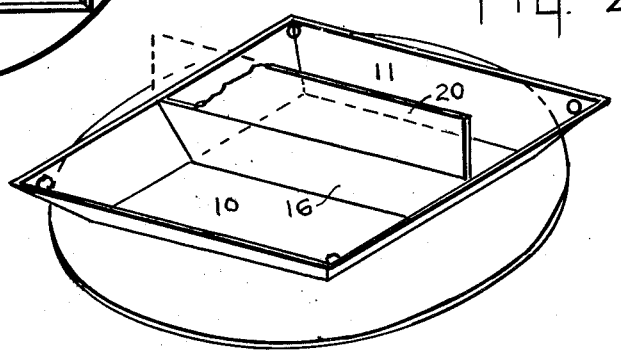
Fig. 2
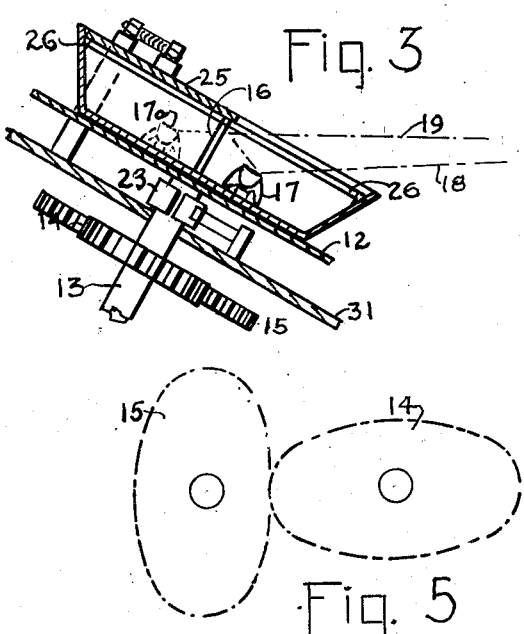
Fig. 3
Fig. 5
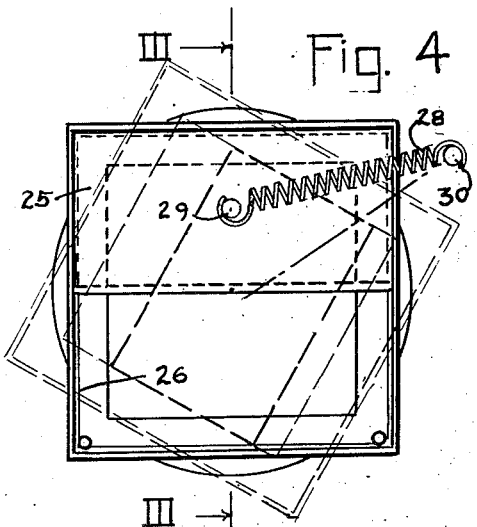
Fig. 4
RONALD E. JOHNSON
HARRY W. WEBER Jr.

United States Patent Office 2,807,467
Patented Sept. 24, 1957

2,807,467

ILLUSION DEVICE

Ronald E. Johnson and Harry W. Weber, Jr.,
Baltimore, Md.

Application December 7, 1953, Serial No. 396,456

5 Claims. (Cl. 272—8)

This invention relates to a magic advertising device. It is an object of this invention to provide a device which will create an air of mystery centered around an article to be displayed which will center the attention of the observer upon it, thus unwittingly causing the observer to examine all sides of the article during the display.

A practical embodiment of the invention is shown in the accompanying drawings, in which Figure 1 is a top plan view of an advertising device, constructed in accordance with this invention. Figure 2 is a perspective view of the same. Figure 3 is a central vertical section through a modified form of the device, in which the tray is tilted at an angle, and is mechanically rotated. Figure 4 is a top plan view of the mechanism of Figure 3 taken from a point in alignment with the axis of rotation. Figure 5 is a detail of a variable speed drive, which may be used to heighten illusion.

In the drawings the numeral 10 is applied to a square tray-like structure having outwardly flaring sides 11. This tray is concentrically mounted upon a turntable 12 rotating about a shaft 13. This turntable is rotated slowly either at uniform speed by any suitable drive means, not shown, or by means which may include gears 14 and 15, to drive at variable speed.

The article to be displayed, here illustrated as a shoe 17 is placed on the bottom of the tray, somewhat spaced from a vertical diametrically disposed double faced mirror 16. The device is intended to be viewed from the front such that the line of vision will see the article just above the upper edge of the side wall of the tray, this line of vision being designated as 18 in Fig. 3. In addition a reflected image will appear in the mirror along the line 19, appearing to place its image just as far back of the mirror position, as the real object lies in front of it.

As the tray is revolved about its axis 13, counter-clockwise as seen in Fig. 4 (but in either direction as seen in Figs. 1 and 2), the article itself will move to the right, while the image will appear to be back of it, and moving to the left, precisely as though two such articles were turning about the axis, until the image passes off the edge of the mirror, just before the mirror comes into alignment with the line of vision. Thereafter the real object is hidden by the mirror, and as the tray continues to turn the image of the tray sides and edges will appear in the mirror completing the real sight of the exposed half of the tray, thus appearing to reveal the entire tray empty. Thus as the tray continues to revolve, the pair of shoes will appear and disappear.

We may however prefer to provide two separate shoes of different kind, one in each side, but similarly placed. Thus one may be a brown shoe and one a black, and in such case it will appear that the black shoes have turned into brown, and then back again.

In the device as so far described without control, from some positions the back half of the tray may in part be visible at the time it should be hidden, and moreover the top edge of the mirror can be seen harming the illusion, during the switching particularly. To overcome these difficulties, as seen in Fig. 1 there is provided a barrier in the form of a board 20 of a thickness at least equal to the thickness of the mirror, lying above the mirror and extending upwardly from it. This board may carry advertising slogans or other language to give the board an apparent excuse for its existence.

If desired the illusion may be strengthened by providing separate electrical illumination for the two sides of the tray as for example lamps 21 and 22, separately wired to turn on only one set at a time. This may be controlled by any conventional switching mechanism here diagrammatically shown as a commutator 23 on shaft 13.

The illusion can be improved by driving the turntable at a variable speed, slowing down the speed while the article is visible and hastening it during the transfer from one side to the other. Many such variable drives are known. As here shown this is accomplished by using two elliptical gears 14 and 15 in the drive chain, timed to give the movement to give the desired change in rate.

Either of these two drives may replace a constant speed drive on either embodiment of the device here shown.

In the construction shown in Fig. 3 the shaft 13, on which the device is mounted, is shown as tilted, the better to show the relation of the real object and the image when viewed horizontally. As previously stated, in this figure 18 represents the direct line of vision from object 17, and 19 the image line of vision which appears to place its image at 17a.

It will be understood that in many installations the axis may be vertical, or tilted enough to bring the normal vision of the observer, on line 19, above the near side wall 11 of the tray and also to insure that the reflected image 17a shall come within the area of the mirror.

In the construction of Figs. 3 and 4 a sliding cover 25 is employed for concealing the back half of the tray. To this end there is provided just inside the top edge of the side wall 11, a groove, or track 26 in which the cover 25 slides easily. This cover 25 is of a size completely to cover one half of the tray and the edge of the mirror, or to slide over the other side and cover the other half of the tray and the edge of the mirror.

Mechanical means are provided to cause the cover 25 to slide over to uncover each side of the tray just as that side comes before the observer. As shown here, this means may comprise a spring 28 connecting a pin 29 in the center of the cover, with a post 30 fixed to the stationary portion 31 of the frame. This post will be arranged beyond the edge of the turntable—on which the tray rotates, and it will be at such an angle around the axis as will cause the cover to slide from the appearing side to the disappearing side, at such a point in the rotation as may cause the illusion desired. The desired angle will depend, also, on the friction of the cover in its track. As here shown the post is situated at an angle around the axis of about 120° to the line of vision, it being intended in this view that the shaft and tray shall rotate counter clockwise.

With, for example, two separate shoes placed in the compartments, as the devices are rotated, the real shoe appears to turn about the axis in the direction of rotation, while the image moves in the opposite direction, as though it, too, was moving about the axis, on the other side of the axis, until, when the mirror is substantially in alignment with the eyes, the image disappears. We prefer to transfer the attention from this compartment to the other about that time by moving the lid.

If desired, the double faced mirror above described may be replaced by a surface mirror 16, that is a mirror having its reflecting surface on the outside. With such a mirror new illusions can be made by attaching direct to the mirror surface one-half of an object. In this manner, in one position of the tray the full object will appear to be present, whereas, in the other position it will appear to have disappeared altogether.

What we claim:

1. An advertising mechanism comprising a tray having sides extending upward to form a box-like structure, said structure being pivoted for rotation about a central vertical axis, a mirror within said box, bisecting it into two portions on a plane containing the axis of rotation, said mirror extending from side to side of the box, and of a height to reflect the image of the object contained in the box into the eyes of a person viewing the object over the edge of the box.

2. A device in accordance with claim 1, adapted to be viewed from a certain point of vision, and having means for concealing that half of the interior of the tray which is more distant from the point of vision.

3. A device in accordance with claim 1, having an opaque barrier extending upward in the plane, and over and beyond the top of the mirror.

4. A device in accordance with claim 1, having a cover mounted for sliding over the top of the box, of a size to cover either half of the box from the mirror to the edge, and means operative on the rotation of the box to cause said cover to slide from one half of the box to the other at one point in the rotation thereof.

5. A device in accordance with claim 4, having a variable speed means for rotating the box about its own axis, said variable speed mechanism being adapted to cause a slow rotation at two opposite points in the cycle, and a fast rotation at the intermediate points, said fast rotation point being at a point where the cover is sliding from one side of the box to the other.

References Cited in the file of this patent

UNITED STATES PATENTS

| | | |
|---|---|---|
| 686,187 | Anderson | Nov. 5, 1901 |
| 889,212 | De Barry | June 2, 1908 |
| 2,046,826 | Lamonte | July 7, 1936 |
| 2,171,054 | Williams | Aug. 29, 1939 |
| 2,273,604 | Vetter | Feb. 17, 1942 |
| 2,381,801 | Bloxom | Aug. 7, 1945 |